E. NEARY.
Device for Measuring Lumber.
No. 212,817. Patented Mar. 4, 1879.
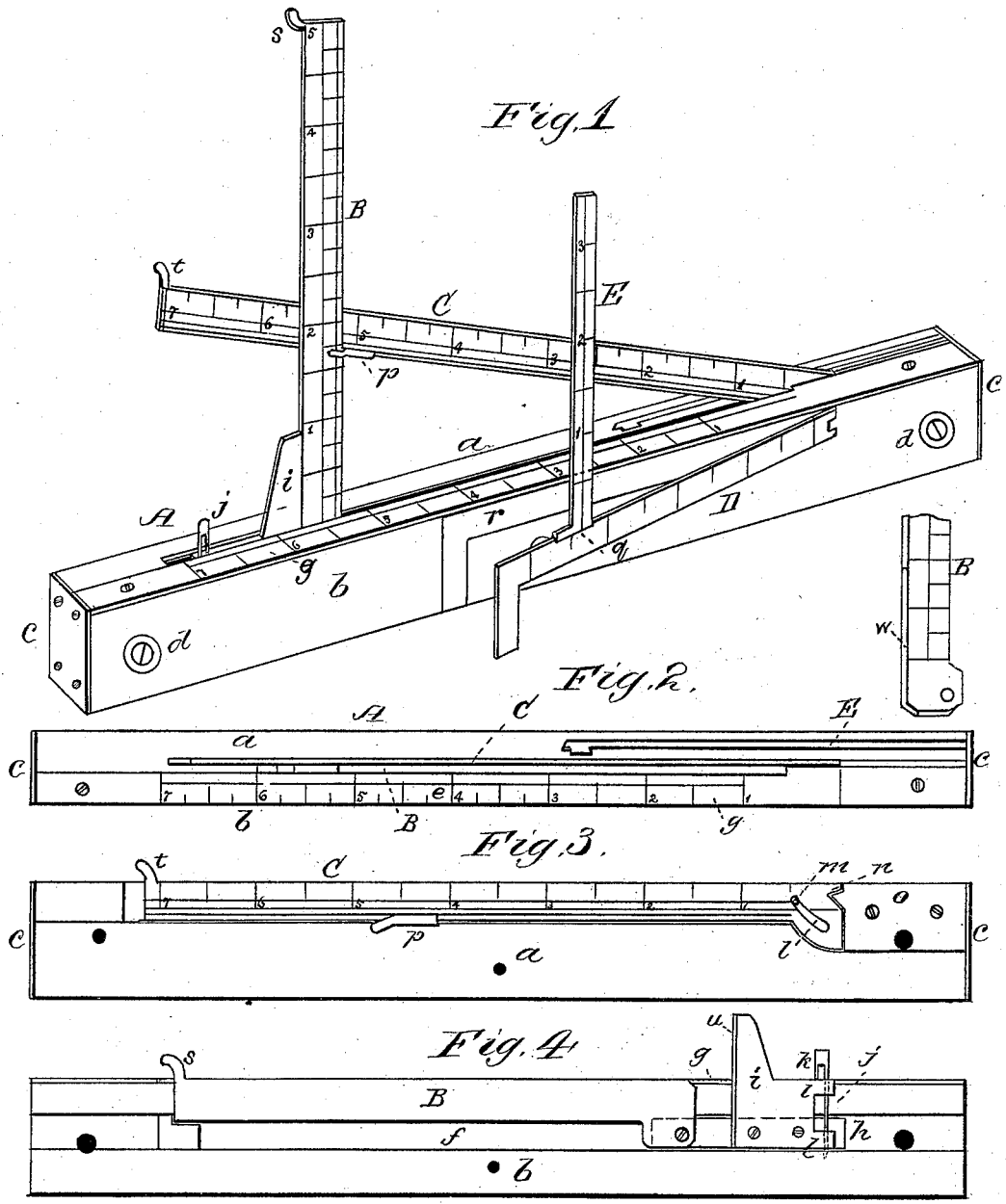
WITNESSES,
Geo. R. Porter
Nat. E. Oliphant
INENTOR,
Edward Neary,
per Chas. H. Fowler,
Attorney.

UNITED STATES PATENT OFFICE.

EDWARD NEARY, OF NESHANIC, NEW JERSEY, ASSIGNOR OF ONE-HALF HIS RIGHT TO EDWARD C. BENNETT, OF SAME PLACE.

IMPROVEMENT IN DEVICES FOR MEASURING LUMBER.

Specification forming part of Letters Patent No. 212,817, dated March 4, 1879; application filed January 20, 1879.

*To all whom it may concern:*

Be it known that I, EDWARD NEARY, of Neshanic, in the county of Somerset and State of New Jersey, have invented a new and valuable Improvement in Devices for Measuring Timber; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my invention, showing it in position to be used. Fig. 2 is a top-plan view. Figs. 3 and 4 are interior views of the two sections forming the casing.

This invention has relation to that class of devices used for measuring the length and angles of timber, such as rafters, bridges, stairways, and all similar classes of work that run at an angle; and the object or purpose of the present invention is to construct a simple device embracing all the instruments or measures required for use in accomplishing the object sought, and so arranging them in a suitable casing that they may be readily used separately or in connection with each other, as circumstances may require.

In the accompanying drawings, A represents a casing, which may be of wood or any other suitable material, said casing consisting of two longitudinal sections, $a$ $b$, secured together by metal end pieces, $c$, connected to the ends of the sections by screws or other suitable means, and screws $d$ passing through the sides of the sections, by which they are firmly held together.

The section $b$, upon its inner face, has a longitudinal groove or recess, $f$, and upon the upper edge of said section is a graduated scale, $g$, divided into inches and fractions thereof. When the casing is made entirely of metal the graduated scale is made directly upon the same, thereby dispensing with the plate and the necessity of securing it to the section $b$. Fitting within the groove or recess $f$ is a block, $h$, of any suitable material, having secured to one of its sides a rest, $i$, and pivoted upright B, having upon one or both of its faces a graduated scale of inches and fractions thereof, and when in use is brought to a vertical position, as illustrated in Fig. 1 of the drawings, said upright, at its lower end, resting against the device or rest $i$, which will bring the upright B square with the base of the casing A, and when the upright is thus properly adjusted and in position the graduated scale thereon will give the height, while the scale $g$ will give the length on the level.

The block $h$ is free to slide within the recess or groove $f$, and is held in position when adjusted by a pin, $j$, its upper end or head having an open recess, $k$, to fit over one of two shoulders, $l$, formed on the rest $i$, and through which the pin passes, its point pressing into the section $b$, which prevents the block from longitudinal displacement.

The section $a$ is also recessed to receive a blade, C, having at one of its ends an inclined slot, $l$, through which passes a pin, $m$, secured to the inner side of the section $a$. The blade C, at the end having the slot $l$, is enlarged, and has a V-shaped recess, $n$, which, when the blade is closed, fits over a correspondingly-formed shoulder or projection on a plate, $o$. The blade C has also a graduated scale, and near its lower edge, upon both sides, is a narrow groove, upon which a slide, $p$, is held.

When the upright B is opened and adjusted longitudinally to register with the desired mark upon the scale $g$, blade C may be raised to the necessary angle, and by the slide $p$ is retained in position against the upright B. The upright B will now give the height desired to be obtained and the blade C the length of angle.

To obtain the measurement of jack-rafters down the hip, a blade, D, is hinged or pivoted to the outer side of section $b$, said blade having a graduation-scale thereon. The blade D is opened to an angle of about forty-five degrees, after which a graduated blade, E, is withdrawn from a recess in the side of the section $b$ and placed in position upon the blade D, as illustrated in Fig. 1. The relative position of the blades D E will give the length and angle of the jack-rafters.

The blade E, upon one of its ends, has a grooved shoe, $q$, which fits over and upon the edge of the blade D, the blade D, when closed, fitting within a recess, r, upon the side of the section b.

The upright B and blade C are formed at their free ends with knobs or thumb-pieces s t, to facilitate opening them when required for use. It will also be noticed that the rest i has a V-shaped edge, u, and the edge of the upright B has a correspondingly-formed groove, w, so that when said upright is brought against the edge of the rest the V-shaped edge will fit within the groove w and make a perfect joint between the same.

Having now fully described my invention, what I claim as new, and desire to secure by Letters Patent, is—

1. The casing A and sliding block h, carrying rest i and pivoted upright B, in combination with the blade C, with slide p, substantially as and for the purpose set forth.

2. The sliding block h and rest i, formed with V-shaped edge u, and the upright B, with groove w and the pin j, in combination with the blade C, as set forth.

3. The frame A, with blades C D E, in combination with upright B, all constructed to operate substantially as and for the purpose described.

In testimony that I claim the above I have hereunto subscribed my name in the presence of two witnesses.

EDWARD NEARY.

Witnesses:
 GILBERT LANE,
 EZEKIEL B. EVERITT.